(12) United States Patent
Johansson

(10) Patent No.: US 10,368,404 B2
(45) Date of Patent: Jul. 30, 2019

(54) SOLID-STATE MICROWAVE DEVICE

(71) Applicant: Whirlpool Corporation, Benton Harbor, MI (US)

(72) Inventor: Conny A. Johansson, Norrkoping (SE)

(73) Assignee: Whirlpool Corporation, Benton Harbor, MI (US)

( * ) Notice: Subject to any disclaimer, the term of this patent is extended or adjusted under 35 U.S.C. 154(b) by 453 days.

(21) Appl. No.: 14/221,528

(22) Filed: Mar. 21, 2014

(65) Prior Publication Data

US 2015/0271877 A1   Sep. 24, 2015

(51) Int. Cl.
*H05B 6/64* (2006.01)
*H05B 6/66* (2006.01)
*H05B 6/68* (2006.01)

(52) U.S. Cl.
CPC .......... *H05B 6/664* (2013.01); *H05B 6/686* (2013.01); *Y02B 40/143* (2013.01)

(58) Field of Classification Search
CPC ... H05B 6/70; H05B 6/68; H05B 6/64; H05B 6/66; H05B 6/664; H05B 6/686
USPC .......... 219/746, 748, 750, 678.69, 736, 745
See application file for complete search history.

(56) References Cited

U.S. PATENT DOCUMENTS

| | | | |
|---|---|---|---|
| 3,204,199 A | 8/1965 | Lance | |
| 4,384,367 A * | 5/1983 | King | H04B 1/26 455/131 |
| 4,557,272 A | 12/1985 | Carr | |
| 5,101,182 A | 3/1992 | Babbitt et al. | |
| 5,721,286 A * | 2/1998 | Lauf | H05B 6/686 522/1 |
| 5,961,871 A * | 10/1999 | Bible | H05B 6/686 219/709 |
| 6,054,696 A | 4/2000 | Lewis et al. | |
| 6,403,939 B1 * | 6/2002 | Fagrell | B01J 19/0046 204/157.43 |
| 7,450,051 B1 * | 11/2008 | Valentine | G01S 7/022 342/115 |
| 2009/0267669 A1 | 10/2009 | Kasai | |

FOREIGN PATENT DOCUMENTS

WO   2004054705 A1   7/2004

OTHER PUBLICATIONS

International Patent Application No. PCT/US2015019688, filed Mar. 10, 2015, Applicant: Whirlpool Corporation, search Report and Written Opinion re: same, dated Jun. 10, 2015.

* cited by examiner

*Primary Examiner* — Dana Ross
*Assistant Examiner* — Ayub A Maye
(74) *Attorney, Agent, or Firm* — Price Heneveld LLP

(57) ABSTRACT

A solid-state microwave generator for applying energy to a load disposed in a cavity is provided. The microwave generator comprises an oscillator, a preamplifier coupled to the oscillator, a power amplifier coupled to the preamplifier; a radiating element coupled to the power amplifier and in communication with the cavity; and a passive, microstrip bandpass filter with a predetermined passband in the microwave region of the electromagnetic spectrum connected in a line between the oscillator and the power amplifier. The output of the passive, microstrip bandpass filter is connected to an input of the power amplifier to limit the energy transmitted by the radiating element into the cavity at frequencies outside of the passband.

11 Claims, 2 Drawing Sheets

SOLID-STATE MICROWAVE DEVICE

BACKGROUND

A conventional microwave oven cooks food by a process of dielectric heating in which a high-frequency alternating electromagnetic field is distributed throughout an enclosed cavity. A sub-band of the radio frequency spectrum, microwave frequencies at or around 2.45 GHz cause dielectric heating primarily by absorption of energy in water contained in the food.

To generate microwave frequency radiation in a conventional microwave, a voltage applied to a high-voltage transformer results in a high-voltage power that is applied to a magnetron that generates microwave frequency radiation. The microwaves are then transmitted to an enclosed cavity containing the food through a waveguide. Cooking food in an enclosed cavity with a single, non-coherent source such as a magnetron may result in non-uniform heating of the food. Existing solutions to more evenly heat food in microwave ovens include, among other things, one or more microwave stirrers to redistribute the microwaves in the cavity, and a turntable for rotating the food in the cavity.

BRIEF DESCRIPTION

In one aspect, a solid-state microwave generator for applying energy to a load disposed in a cavity is provided. The microwave generator comprises an oscillator, a preamplifier coupled to the oscillator, a power amplifier coupled to the preamplifier; a radiating element coupled to the power amplifier and in communication with the cavity; and a passive bandpass filter with a predetermined passband in the microwave region of the electromagnetic spectrum connected in a line between the oscillator and the power amplifier. The output of the passive bandpass filter is connected to an input of the power amplifier to limit the energy transmitted by the radiating element into the cavity at frequencies outside of the passband.

In another aspect, a microwave oven is provided with the foregoing solid-state microwave generator.

DETAILED DESCRIPTION

A solid-state radio frequency (RF) cooking appliance heats and prepares food by introducing electromagnetic radiation into an enclosed cavity. Multiple RF feeds at different locations in the enclosed cavity produce dynamic electromagnetic wave patterns as they radiate. To control and shape the wave patterns in the enclosed cavity, the multiple RF feeds may radiate waves with separately controlled electromagnetic characteristics to maintain coherence (that is, a stationary interference pattern) within the enclosed cavity. For example, each RF feed may transmit a different phase and/or amplitude with respect to the other feeds. Other electromagnetic characteristics may be common among the RF feeds. For example, each RF feed may transmit at a common but variable frequency. Although the following embodiments are directed to a cooking appliance where RF feeds direct electromagnetic radiation to heat an object in an enclosed cavity, it will be understood that the microwave oven described herein and the inventive concepts derived herefrom are not so limited. The covered concepts are applicable to any RF device where electromagnetic radiation is directed to an enclosed cavity to act on an object inside the cavity. Exemplary devices include ovens, dryers, steamers, and the like.

Figure 1:
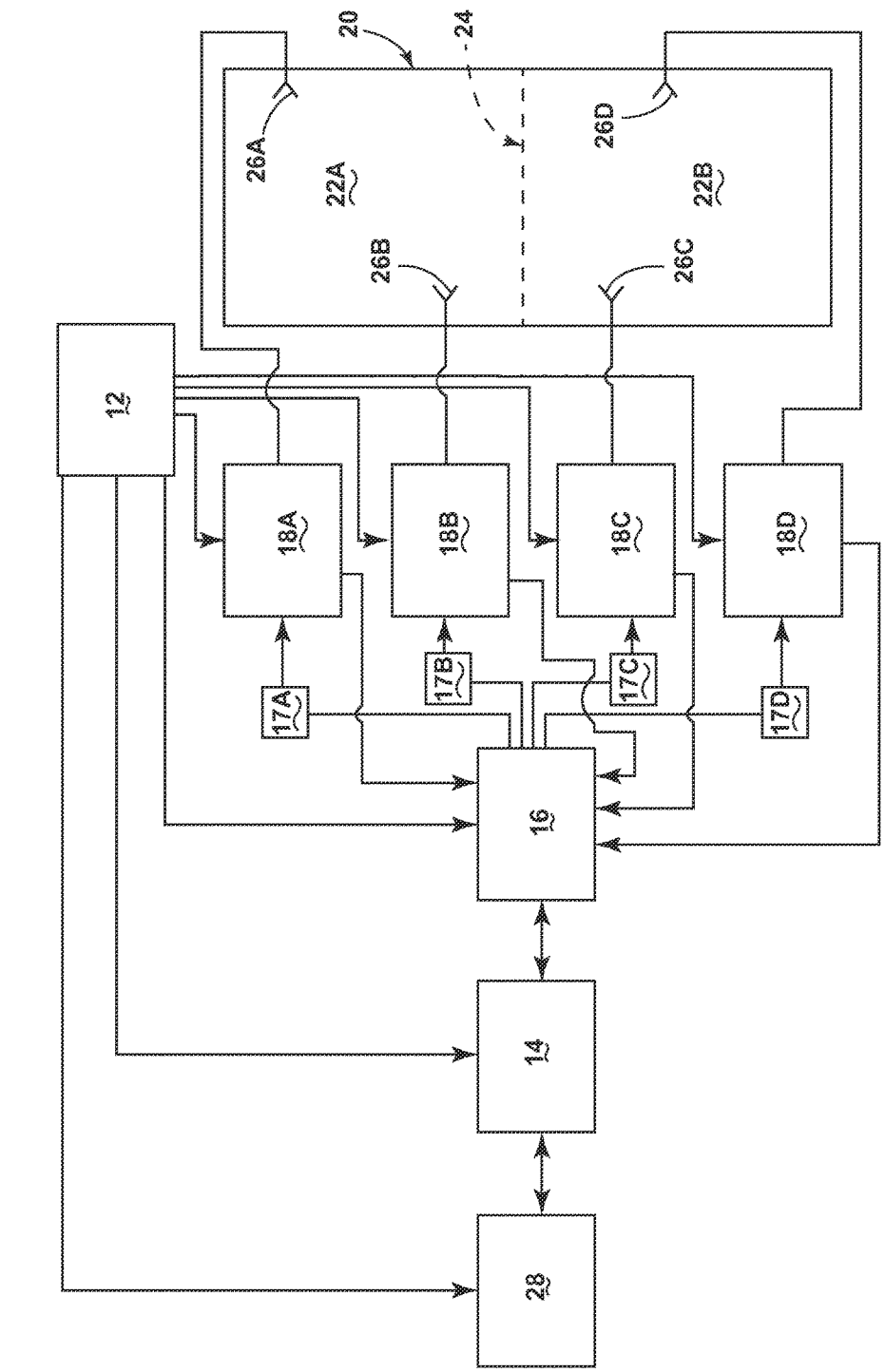
FIG. 1 shows a block diagram view of signal paths for a microwave oven with multiple RF feeds according to an embodiment of the invention.

FIG. 1 shows a block diagram of the signal paths in a microwave oven 10 with multiple RF feeds 26A-D according to one embodiment. The microwave oven 10 includes a power supply 12, a controller 14, a small signal microwave generator 16, a human-machine interface 28, one or more bandpass filters 17A-D and multiple power amplifiers 18A-D, each coupled to a respective RF feed 26A-D. The multiple RF feeds 26A-D each couple RF power from one of the multiple power amplifiers 18A-D into the enclosed cavity 20.

The power supply 12 provides electrical power derived from mains electricity to the controller 14, the small signal microwave generator 16, the human-machine interface 28 and the multiple power amplifiers 18A-D. The power supply 12 converts the mains electricity to the required power level of each of the devices it powers. The power supply 12 may deliver a variable output voltage level. For example, the power supply 12 may output a voltage level selectively controlled in 0.5-volt steps. In this way, the power supply 12 may be configured to typically supply 28 volts direct current (DC) to each of the power amplifiers 18A-D, but may supply a lower voltage, such as 15 volts DC, to decrease an RF output power level by a desired level.

The controller 14 may be included in the microwave oven 10, which may be operably coupled with various components of the microwave oven 10 to implement a cooking cycle. The controller 14 may also be operably coupled with a control panel or human-machine interface 28 for receiving user-selected inputs and communicating information to a user. The human-machine interface 28 may include operational controls such as dials, lights, switches, touch screen elements, and/or displays enabling a user to input commands, such as a cooking cycle, to the controller 14 and receive information. The user interface 28 may be one or more elements, which may be centralized or dispersed relative to each other.

The controller 14 may be provided with a memory and a central processing unit (CPU), and may be preferably embodied in a microcontroller. The memory may be used for storing control software that may be executed by the CPU in completing a cooking cycle. For example, the memory may store one or more pre-programmed cooking cycles that may be selected by a user and completed by the microwave oven 10. The controller 14 may also receive input from one or more sensors. Non-limiting examples of sensors that may be communicably coupled with the controller 14 include peak level detectors for measuring RF power levels and temperature sensors for measuring the temperature of the enclosed cavity 20 or one or more of the power amplifiers 18A-D.

Based on the user input provided by the human-machine interface 28 and data including the incident and reflected power magnitudes coming from the multiple power amplifiers 18A-D (represented in FIG. 1 by the path from each of the power amplifiers 18A-D through the small signal microwave generator 16 to the controller 14), the controller 14 may determine the cooking strategy and calculate the settings for the small signal microwave generator 16. In this way, one of the main functions of controller 14 is to actuate the microwave oven 10 to instantiate the cooking cycle as initiated by the user. The small signal microwave generator 16 as described below may generate one or more microwave signals, that is, one for each power amplifier 18A-D based on the settings indicated by the controller 14.

The power amplifiers 18A-D, each coupled to one of the RF feeds 26A-D, output a high power microwave signal based on a low power microwave signal provided by the small signal microwave generator 16. The low power microwave signal input to each of the power amplifiers 18A-D may be amplified by transforming the direct current electrical power provided by the power supply 12 into a high power microwave signal. For example, each power amplifier 18A-D may be capable of outputting a 250-watt microwave signal. The maximum output wattage for each power amplifier 18A-D may be more or less than 250 watts depending upon the implementation.

Additionally, each of the power amplifiers 18A-D includes a sensing capability to measure the magnitude of the incident and the reflected power levels at the amplifier output. The measured reflected power at the output of each power amplifier 18A-D indicates a power level returned to the power amplifier 18A-D as a result of an impedance mismatch between the power amplifier 18A-D and the enclosed cavity 20. Besides providing feedback to the controller 14 and the small signal microwave generator 16 to dictate, in part, a cooking strategy, the reflected power level may be significant because excess reflected power may damage the power amplifier 18A-D.

Consequently, each power amplifier 18A-D may include a dummy load to absorb excessive RF reflections. Along with the determination of the reflected power level at each of the power amplifiers 18A-D, temperature sensing at the power amplifiers 18A-D including at the dummy load may provide the data necessary to determine if the reflected power level has exceeded a predetermined threshold. If the threshold is exceeded, any of the controlling elements in the RF transmission chain including the power supply 12, controller 14, the small signal microwave generator 16, or the power amplifiers 18A-D may determine that any one or more of the power amplifiers 18A-D may be switched to a lower power level or completely turned off. For example, any power amplifier 18A-D may switch itself off automatically if the reflected power level or sensed temperature is too high for several milliseconds. In another example, the power supply 12 may cut the direct current power supplied to all of the power amplifiers 18A-D.

Each of the multiple RF feeds 26A-D includes a radiating element coupled to a power amplifier 18A-D and in communication with the enclosed cavity 20. The radiating element of each of the multiple RF feeds 26A-D may be implemented via a waveguide structure designed for low power loss propagation of microwave signals. For example, metallic, rectangular waveguides known in microwave engineering are capable of guiding RF power from a power amplifier 18A-D to the enclosed cavity 20 with a power attenuation of approximately 0.03 decibels per meter. Other types of radiating elements may include one or more antenna structures or a combination of a waveguide and antenna structure. The multiple RF feeds 26A-D may be coupled to the enclosed cavity 20 in spatially separated but fixed physical locations.

The enclosed cavity 20 may selectively include subcavities 22A-B by insertion of an optional divider 24 therein. The enclosed cavity 20 may include on at least one side a shielded door to allow user access to the interior of the enclosed cavity 20 for placement and retrieval of food or the optional divider 24.

The transmitted bandwidth of each of the RF feeds 26A-D may preferably include frequencies in the electromagnetic spectrum ranging from 2.4 GHz to 2.5 GHz. The RF feeds 26A-D may be configured to transmit other RF bands. For example, the bandwidth of frequencies between 2.4 GHz and 2.5 GHz is one of several bands that make up the industrial, scientific and medical (ISM) radio bands. The transmission of other RF bands is contemplated and may include non-limiting examples contained in the ISM bands defined by the frequencies: 13.553 MHz to 13.567 MHz, 26.957 MHz to 27.283 MHz, 902 MHz to 928 MHz, 5.725 GHz to 5.875 GHz and 24 GHz to 24.250 GHz.

Figure 2:
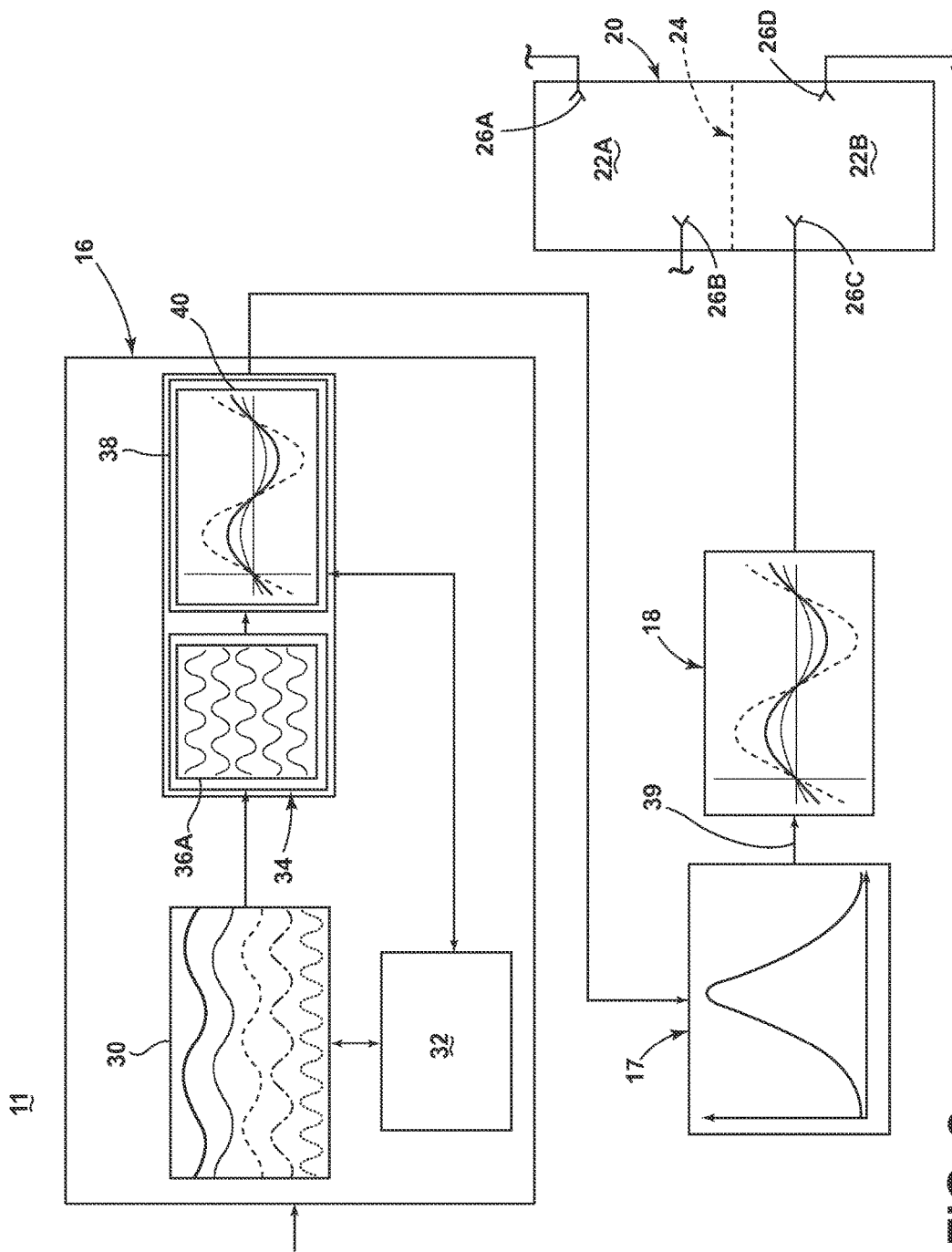
FIG. 2 shows an enlarged block diagram view of a solid-state microwave generator for one of the RF feeds of the microwave oven of FIG. 1.

FIG. 2 shows a block diagram of a solid-state microwave generator 11 for a single RF feed 26C of the microwave oven. The small signal microwave generator 16 may include an oscillator 30, a phase generator 34 and a preamplifier 38 sequentially coupled and all under the direction of an RF controller 32. In this way, the actual frequency, phases and amplitudes to be output from the small signal microwave generator 16 are programmable through the RF controller 32, preferably implemented as a digital control interface. The small signal microwave generator 16 may be physically separate from the cooking controller 14 or may be physically mounted onto or integrated into the controller 14. The small signal microwave generator 16 is preferably implemented as a bespoke integrated circuit.

As shown in FIG. 2 the small signal microwave generator 16 may output a single microwave signal to drive a single RF feed 26C. However, as shown in FIG. 1, the small signal microwave generator 16 may also output multiple microwave signals to drive multiple RF feeds 26A-D. For example, the small signal microwave generator 16 may drive multiple RF feeds 26A-D that share a common but variable frequency (e.g. ranging from 2.4 GHz to 2.5 GHz), but are settable in phase and amplitude for each RF feed 26A-D. The configuration described herein is exemplary and should not be considered limiting. The small signal microwave generator 16 may be configured to output more or less channels and may include the capability to output a unique variable frequency for each of the channels depending upon the implementation.

As previously described, the small signal microwave generator 16 may derive power from the power supply 12 and input one or more control signals from the controller 14. Additional inputs may include the incident and reflected power levels determined by the power amplifiers 18A-D. Based on these inputs, the RF controller 32 may select a frequency and signal the oscillator 30 to output a signal indicative of the selected frequency. As represented pictorially in the block representing the oscillator 30 in FIG. 2, the selected frequency determines a sinusoidal signal whose frequency ranges across a set of discrete frequencies. For example, a selectable bandwidth ranging from 2.4 GHz to 2.5 GHz may be discretized at a resolution of 1 MHz allowing for 101 unique frequency selections.

For a microwave oven 10 with multiple RF feeds 26A-D, the small signal microwave generator 16 may be capable of controlling the signal phase for the resulting microwave signal. In the case of coherent signal control, after the oscillator 30, the microwave signal may be directed to the phase generator 34. A single channel phase generator 36 may assign a distinct phase, that is, the initial angle of a sinusoidal function to the input signal. As represented pictorially in the block representing the single channel phase generator

36 in FIG. 2, the selected phase of the microwave signal for a channel may range across a set of discrete angles. For example, a selectable phase (wrapped across half a cycle of oscillation or 180 degrees) may be discretized at a resolution of 10 degrees allowing for 19 unique phase selections per channel.

Subsequent to the single channel phase generator 36, the microwave signal per channel may be directed from the phase generator 34 to the preamplifier 38. Following a control signal from the RF controller 32, the preamplifier 38 may amplify or attenuate the microwave signal per channel to a distinct amplitude. As represented pictorially in the block representing the per channel preamplifier 40 in FIG. 2, the selected amplitude of the microwave signal may range across a set of discrete amplitudes (or power levels). For example, a selectable amplitude may be discretized at a resolution of 0.5 decibels across a range of 0 to 23 decibels allowing for 47 unique amplitude selections per channel.

The low power microwave signal output from the preamplifier 38 is input to the power amplifier 18. The power amplifier 18 amplifies the microwave signal by transforming the direct current electrical power provided by the power supply 12 into a high power microwave signal. The amplitude of the microwave signal may be controlled by one of several methods depending upon the implementation. For example, control of the supply voltage of the preamplifier 38 for each channel may result in an output amplitude for each channel from the small signal microwave generator 16 that is directly proportional to the desired microwave signal output for the subsequent power amplifier 18. Alternatively, the per channel output may be encoded as a pulse-width modulated signal where the amplitude level is encoded by the duty cycle of the pulse width modulated signal. Yet another alternative is to coordinate the per channel output of the power supply 12 to vary the supply voltage supplied to each of the power amplifiers 18A-D to control the final amplitude of the microwave signal transmitted to the enclosed cavity 20.

The bandpass filter 17 is connected between the oscillator 30 and the power amplifier 18. To minimize power loss, the bandpass filter 17 is preferably disposed between the preamplifier 38 and the power amplifier 18. The output 39 of the bandpass filter is in close proximity and immediate to the input of the power amplifier 18. The close proximity between the bandpass filter 17 and the power amplifier 18 reduces the amplification of frequencies outside the pass band of the bandpass filter 17 that may have been injected into the microwave signal at any point prior to the power amplifier 18.

The bandpass filter 17 is configured with a predetermined passband in the microwave region of the electromagnetic spectrum (e.g. the range of frequencies in the electromagnetic spectrum from 2.4 GHz to 2.5 GHz). As represented pictorially in the block representing the bandpass filter 17 in FIG. 2, the filter passes a range of frequencies around a center frequency and attenuates frequencies outside of the passband.

Preferably, the bandpass filter 17 is passive (i.e. the filter does not amplify the microwave signal) and designed by using microstrip technology. Microstrip technology is a type of electrical transmission line fabricated using printed circuit board technology that generally consists of a conducting strip separated from a ground plane by a dielectric layer or substrate. Microstrip elements convey microwave frequency signals based on the pattern of metallization on the substrate.

By placing the passive bandpass filter 17 between the oscillator 30 and power amplifier 18 on a low signal line where the pass band is centered about the operating frequencies of the microwave oven 10, the risk to amplify unintended frequencies is reduced. In this way, the passive bandpass filter 17 limits the energy transmitted by the radiating element of the RF feed 26 into the enclosed cavity 20 at frequencies outside of the passband. For example, if a fault occurs in the oscillator 30 or preamplifier 38, microwave power may be generated at frequencies in a range that the door sealing on the enclosed cavity 20 cannot prevent from leaking. The bandpass filter 17 attenuates the amplitudes of the unintended frequencies, effectively mitigating the radiative leakage.

As described above, the microwave oven 10 may deliver a controlled amount of power at multiple RF feeds 26A-D into the enclosed cavity 20. Further, by maintaining control of the amplitude, frequency and phase of the power delivered from each RF feed 26A-D, the microwave oven 10 may coherently control the power delivered into the enclosed cavity 20. Coherent RF sources deliver power in a controlled manner to exploit the interference properties of electromagnetic waves. That is, over a defined area of space and duration of time, coherent RF sources may produce stationary interference patterns such that the electric field is distributed in an additive manner. Consequently, interference patterns may add to create an electromagnetic field distribution that is greater in amplitude than any of the RF sources (i.e. constructive interference) or less than any of the RF sources (i.e. destructive interference).

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A solid-state microwave generator for applying energy to a food load disposed in a cavity of a microwave oven, comprising:
   an oscillator;
   a preamplifier coupled to the oscillator;
   a power amplifier coupled to the preamplifier;
   a radiating element coupled to the power amplifier and in communication with the cavity of the microwave oven;
   a passive bandpass filter with a predetermined passband in the microwave region of the electromagnetic spectrum connected in a line between the oscillator and the power amplifier, wherein the predetermined passband is selected for microwave frequencies to heat the food load;
   wherein an output of the passive bandpass filter is connected to an input of the power amplifier to limit the energy transmitted by the radiating element into the cavity at frequencies outside of the passband, and
   wherein the oscillator, the preamplifier, the power amplifier, the radiating element, and the passive bandpass filter are included in the microwave oven.

2. The solid-state microwave generator of claim 1 wherein the passive bandpass filter is disposed between the preamplifier and the power amplifier.

3. The solid-state microwave generator of claim 1 wherein the line is a low signal line.

4. The solid-state microwave generator of claim 1 wherein the output of the passive bandpass filter is immediate to the input of the power amplifier.

5. The solid-state microwave generator of claim 1 wherein the passive bandpass filter includes a microstrip.

6. A microwave oven comprising:
a cavity configured to contain a food load and sealed against leakage of microwave energy at a given frequency range selected to heat the food load;
the microwave oven further comprising:
a solid-state microwave generator for applying energy to the food bad disposed in the cavity, and having:
an oscillator;
a preamplifier coupled to the oscillator; a power amplifier coupled to the preamplifier;
a radiating element coupled to the power amplifier and in communication with the cavity;
a passive bandpass filter with a predetermined passband in the given frequency range connected in a line between the oscillator and the power amplifier; and
wherein an output of the passive bandpass filter is connected to an input of the power amplifier to limit the energy transmitted by the radiating element into the cavity at frequencies outside of the given frequency range.

7. The microwave oven of claim 6 wherein the passive bandpass filter is disposed between the preamplifier and the power amplifier.

8. The microwave oven of claim 6 wherein the line is a low signal line.

9. The microwave oven of claim 6 wherein the output of the passive bandpass filter is immediate to the input of the power amplifier.

10. The microwave oven of claim 6 wherein the given frequency range is 2.4 to 2.5 GHz.

11. The microwave oven of claim 6 wherein the passive bandpass filter includes a microstrip.

* * * * *